United States Patent
Basovnik et al.

(10) Patent No.: US 10,394,922 B2
(45) Date of Patent: Aug. 27, 2019

(54) USER INDEX WITH NICKNAMES

(71) Applicant: Facebook, Inc., Menlo Park, CA (US)

(72) Inventors: Stanislav Basovnik, Mountain View, CA (US); Daniel Ricketts, Catonsville, MD (US); Maxim Gubin, Walnut Creek, CA (US)

(73) Assignee: Facebook, Inc., Menlo Park, CA (US)

( * ) Notice: Subject to any disclaimer, the term of this patent is extended or adjusted under 35 U.S.C. 154(b) by 141 days.

(21) Appl. No.: 14/320,035

(22) Filed: Jun. 30, 2014

(65) Prior Publication Data

US 2015/0379133 A1    Dec. 31, 2015

(51) Int. Cl.
*G06F 16/17*    (2019.01)
*G06F 16/23*    (2019.01)
*G06F 16/955*    (2019.01)

(52) U.S. Cl.
CPC ........ *G06F 16/955* (2019.01); *G06F 16/1734* (2019.01); *G06F 16/2358* (2019.01)

(58) Field of Classification Search
CPC ................................................. G06F 17/30864
USPC ........................................................ 707/711
See application file for complete search history.

(56) References Cited

U.S. PATENT DOCUMENTS

| | | | |
|---|---|---|---|
| 6,839,680 B1 * | 1/2005 | Liu et al. ...................... | 705/7.33 |
| 9,691,075 B1 * | 6/2017 | Ray .................... | G06Q 30/0201 |
| 2007/0198597 A1 * | 8/2007 | Betz et al. ..................... | 707/201 |
| 2014/0258401 A1 * | 9/2014 | Tseng ............................ | 709/204 |
| 2014/0365507 A1 * | 12/2014 | Wissner ............... | G06F 16/972 |
| | | | 707/748 |

* cited by examiner

*Primary Examiner* — Jean B Fleurantin
(74) *Attorney, Agent, or Firm* — Baker Botts L.L.P.

(57) ABSTRACT

In one embodiment, a method includes receiving data that includes an association between a nickname and a primary name, determining whether the association meets a nickname association threshold, and generating at least one expanded index entry that associates the nickname with the primary name when the association meets the nickname association threshold. The data may include a log entry indicating that a search for the nickname that returned the primary name as a result was followed by a user selection of the primary name, and the method may further include incrementing a counter value associated with the nickname and the primary name. The data may include a first log entry indicating that a search for the nickname returned a result the user did not select, followed by a second log entry indicating that a search for the primary name returned the primary name, and a user selected the primary name.

18 Claims, 8 Drawing Sheets

| Queries: | | Name | Language |
|---|---|---|---|
| 404 Chris, language=English | | Jennifer Nelson | English |
| | | (Samantha \| Sam) Lewis | English |
| 406 Chris, language=German | | (Christopher \| Chris) Parker | 422 English |
| | | (William \| Bill) Smith | English |
| | | (Christoph \| Chris) Schmidt | 424 German |
*FIG. 4*
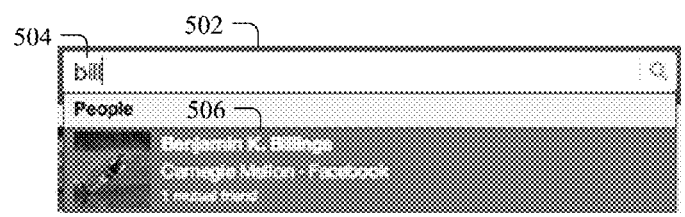
*FIG. 5*

602

| Log | | |
|---|---|---|
| Nickname | Primary Name | Attributes |
| Chris | Christopher | (Male) |
| Chris | Christina | (Female) |
| Mel | Melvin | (Male) |
| Mel | Melissa | (Female) |
| Betty | Elizabeth | (Female) |
| Liz | Elizabeth | (Female) |
| Maggie | Magnolia | (Female) |
| TheTerrible | (Not found) | |
| Ivan | Ivan Vasilyevich | (Male) |
| Borya | Boris Gudonov | (Russian, West Hollywood) |

*FIG. 6*

USER INDEX WITH NICKNAMES

TECHNICAL FIELD

This disclosure generally relates to user identification in social networks, and more particularly to using nicknames to identify users in social networks.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In one or more embodiments, nicknames may be associated with users of a social network, and the users may be addressed and identified using their associated nicknames. Users may provide their nicknames to the social network as part of their profile, but need not do so, since nicknames may be determined automatically. The techniques described herein may determine nicknames for a user based on information such as the user's primary name (e.g., given name or first name on the social network), common nicknames for the primary name, activity in the social network, such as other users referring to the user by nicknames, and so on.

To enable efficient searching for users by nickname, a set of one or more nicknames may be generated for each user and added to an index of user information, such as an index that associates user login names with corresponding primary names and user profile information such as unique per-user identifiers. The addition of nicknames to the user index thus generates an expanded index that includes nicknames for the users. Searches for users by their primary names may then be expanded to search the expanded index for entries having nicknames that match the search query. In other embodiments, nicknames may be stored as entries in a nickname index that associates the nicknames with the user's identifier and/or primary name.

The nicknames for particular users may be deduced from actions in the social network. When users perform actions that may be grouped together based on a common attribute, such as being submitted by the same user, in a single session, and/or within a threshold time period, and the grouped actions refer to different primary names, then one of the names may be identified as a potential nickname for the other name.

The nicknames for particular users may be deduced from information about the users, such as their location, age, gender, and language, and from known properties of nicknames and primary names, such as the location, age, gender, and language commonly associated with the nicknames for particular primary names. The deduced nicknames may be stored in the nickname search index in association with their corresponding users.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 4 illustrates example queries of an expanded index that includes a language attribute.

FIG. 5 illustrates an example of generating an expanded index based on user actions in a user interface.

FIG. 6 illustrates an example name-association log for use in constructing an expanded index.

DESCRIPTION OF EXAMPLE EMBODIMENTS

Figure 1:
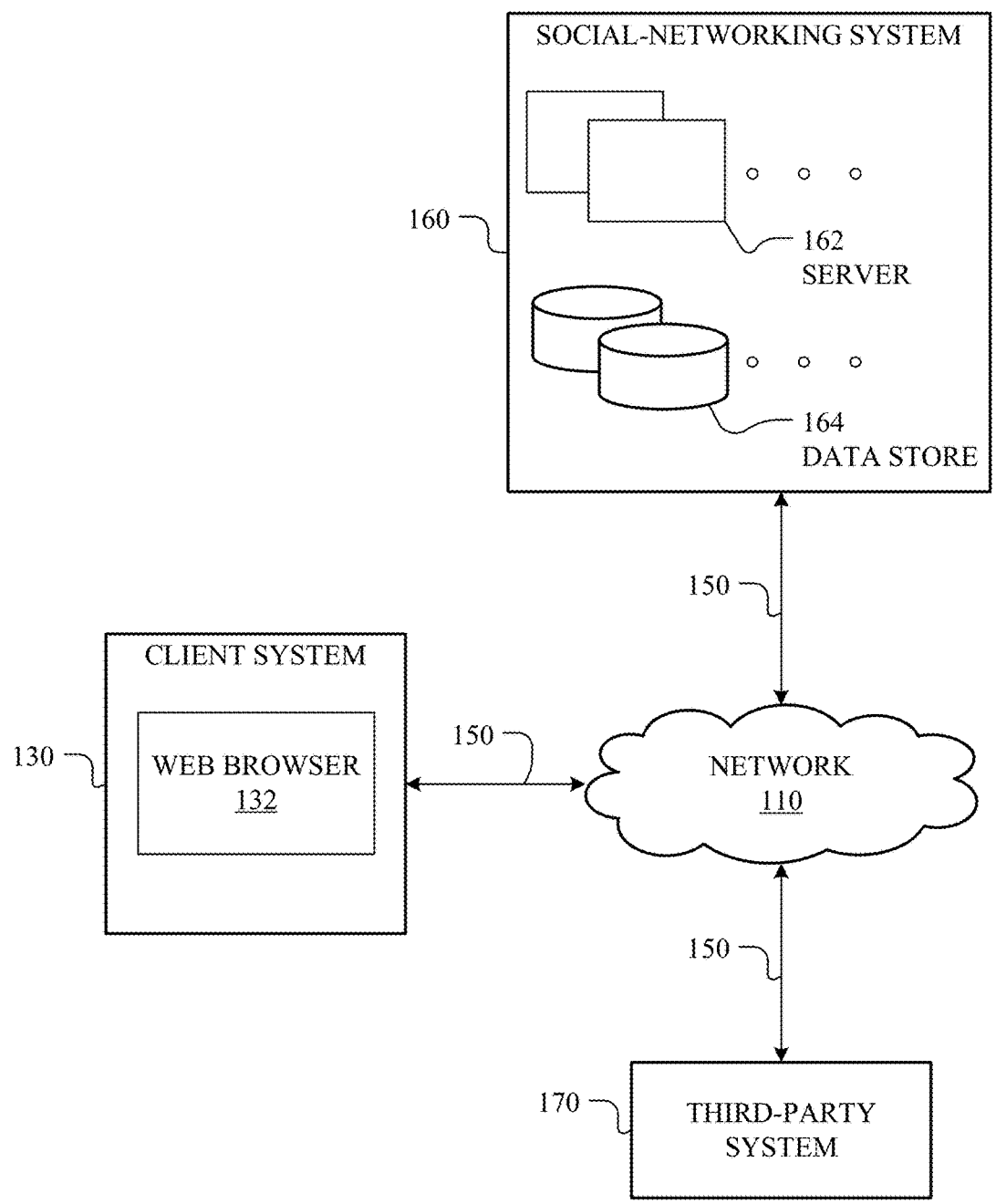
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that may host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user may add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user may be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In one or more embodiments, nicknames may be associated with users of a social network, and the users may be addressed and identified using their associated nicknames. In social networks, a user may be identified by names such as a primary name, which may be displayed with information about the user, and may be searched for by other users to find the user in a social network. A user's primary name may be, for example, the user's given name, first name, full legal name, or other preferred name, and is often associated with the user's social network profile or account when the user becomes a member of the social network. People often have nicknames, however, which are additional names by which they may be identified. For example, a user may have a primary name of "Christopher" and a nickname of "Chris." A user may have multiple nicknames, e.g., "Christoph" in addition to "Chris," and the user may be identified by any of the nicknames. Users may provide their nicknames to the social network as part of their profile, but need not do so. The techniques described herein may automatically determine nicknames for a user based on information such as the user's primary name, common nicknames for the primary name, activity in the social network such as other users referring to the user by nicknames, and so on.

To enable efficient searching for users by nickname, a set of one or more nicknames may be generated for each user and stored as entries in an index that associates the nicknames with the user's primary name (or user profile). Searches for users that match a given search string may then be expanded to search the nicknames by querying the index for entries that associate nicknames matching the search string with primary names. If there are any such entries in the index, then the primary names or profiles associated with those entries identify the users that match the given search string. For example, when a user enters the name "Bob" as a search query, the nickname search automatically identifies Bob as a nickname for the primary name Robert, and returns results that include the primary name Robert. This index expansion technique may result in faster searches, since latency and system load due to run-time query expansion for the same purpose may be reduced or eliminated.

The nickname search index may be constructed using information that associates particular nicknames with particular users. For example, a user having the primary name Christopher may explicitly state that his nickname is Chris. Alternatively, the nickname may be deduced from actions in the social network. When users perform actions that may be grouped together based on a common attribute, such as being submitted by the same user, in a single session, and/or within a threshold time period, and the grouped actions refer to different primary names, then one of the names may be identified as a potential nickname for the other name.

For example, suppose another user searches for the name Chris, and a matching search result "Christine" is presented to the user, but the user does not select the search result. If the user then searches for the name Christopher and selects a matching user from a search result, then Chris may be identified as a potential nickname for the user that was selected.

The nicknames for particular users may be deduced from information about the users, such as their location, age, gender, and language. Nicknames for particular users may also be deduced from known properties of nicknames and primary names, such as the location, age, gender, and language commonly associated with the nicknames for particular primary names. The deduced nicknames may be stored in the nickname search index in association with their corresponding users. Further, additional attributes, such as location, age, gender, and language of the user, may also be stored in the nickname search index in association with the users. A search query may include attributes such as location, age, gender, and language of the user being searched for. If any such additional search criteria are supplied as part of a search query, then any expanded index entries that match the name and have attributes matching the criteria are returned as the search results.

Figures 2, 3:
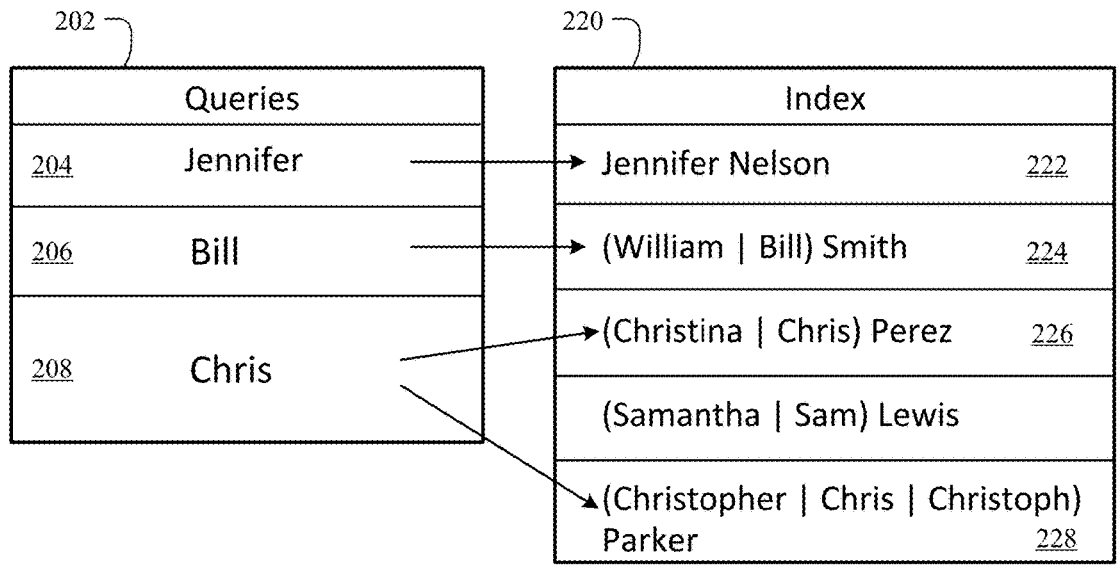
FIG. 2 illustrates example queries of an expanded index.
FIG. 3 illustrates a table representation of an expanded index with additional attributes.

FIG. 2 illustrates example queries 202 of an expanded index 220. The index 220 includes associations between primary names and nicknames. To find the nickname for a specified primary name, a query 204 may be executed by searching the index 220 for an entry 222 that includes the specified primary name. If such an entry 222 is found, then the nickname(s) associated with the entry 222 may be returned as a result of the query 204. One or more queries 202 may be executed by searching the index 220 for an entry that includes a specified primary name or nickname. A primary name may include a given (or first) name and a family (or last) name. The index 220 may be expanded from a table of (user identifier, primary name) mappings to include nicknames by adding one or more nicknames to each entry, resulting in entries of the form (user identifier, primary name, nickname). The user identifiers may be unique values associated with each row, such as a row identifier, the row number, or an identifier assigned by a user account management service. In the example of FIG. 2, index entries 222-228, which associate nicknames with primary names, are shown in the form (primaryname-given nickname) primaryname-family, which specifies that "nickname" is a nickname for a user who has a given name specified by "primaryname-given," and a family name specified by "primaryname-family." (A user's given name is referred to herein as "primaryname-given" and the user's family name is referred to herein as "primaryname-family.") Each index entry may include one or more nicknames, which are alternative names for the user identified by the entry's primary name. For example, the index 220 includes an entry Jennifer Nelson, which represents a primary name having given name Jennifer and family name Nelson, but no nickname. An index entry 224 represents a primary given name "William" associated with a nickname Bill and a family name Smith. An entry "(Christina|Chris) Perez" 226 associates the nickname "Chris" with the primary given name "Christina" and the primary family name "Parker." An entry 228 "(Christopher|Chris|Christoph) Parker" associates the nicknames "Chris" and "Christoph" with the primary given name Christopher and the primary family name Parker. That is, the entry "(Christopher|Chris|Christoph) Parker" 224 specifies that the primary name "Christopher Parker" has two nicknames, "Chris Parker" and "Christoph Parker." In other embodiments, index entries may be represented as associations between a primary given name and a nickname, without a family name, in which case family names are not included in the queries or search results.

When a nickname that corresponds to a user's primary name is determined using techniques described herein, the nickname may be added to a database index to form an expanded index 210 that associates primary names with usernames, user identifiers, user profile information, and the nicknames. That is, nicknames may be associated with each user account. User accounts may be associated with unique user identifiers that distinguish between different users with the same primary names. In other embodiments, a separate nickname index that associates user identifiers, usernames and/or primary names with nicknames may be maintained. Nicknames may then be associated with the given name portion of primary names and other optional attributes such as language, in which case different users with a particular given name and language combination may be associated with the same nickname.

In the example of FIG. 2, the expanded index 220 may be created by adding the nicknames Bill, Chris, and Sam to an initial index that includes the primary names Jennifer Nelson, William Smith, Christina Perez, Samantha Lewis, and Christopher Parker. In one or more embodiments, the index 220 may be implemented using a forward index and an inverted index, with the forward index providing efficient lookup and retrieval of nicknames in the forward direction, e.g., when a primary name such as Christopher or Christopher Parker is received. The reverse index may provide efficient lookup and retrieval of usernames in the reverse direction, e.g., when a nickname such as Chris is received. Other suitable types of indexes may be used, e.g., the nickname database index may be implemented using a database table having column indexes on primary name and nickname columns for efficient retrieval of rows that represent the index entries.

For example, a query 204 specifies that the expanded index 220 is to be searched for the name "Jennifer." A search of the index 220 for the primary name "Jennifer" finds the "Jennifer Nelson" entry 222, which does not include a nickname. The query 204 therefore returns a result indicating that there is no nickname for Jennifer. The query 204 may also return the full primary name, e.g., Jennifer Nelson, and associated user profile information (if any). The index 220 may also be searched for a nickname "Jennifer." Since there is no nickname with the value "Jennifer," this query may return a result indicating that Jennifer is not a nickname. In another example, a query 206 of the index 220 for the name "Bill" finds the "(William|Bill) Smith" entry 224, which matches the query because it includes the nickname "Bill." The primary name specified in the entry 224, William Smith, is therefore returned as a result for the query 206. As another example, a query 208 of the index 220 for the name "Chris" finds the "(Christina|Chris) Perez" entry 226, which matches the query 208 because it includes the nickname "Chris.". Therefore, "Christina Perez" is returned as a result of the query 208. The index entry 228 also includes the nickname Chris, but the entry 226 is returned as the result because, in this example, the entry 226 is the first match when the index is searched in row order. Other criteria, such as attributes, can be used to decide which entry to return, as described elsewhere herein. For instance, if the query 208 is extended to request German names, then "Christoph" may be returned, since Christoph may be recognized as a German name, even if no explicit language attribute is included in the index entry 228. In another example, both entries 226 and 228 may be returned for the query "Chris" 208 (e.g., Christina Perez and Christopher Parker). In another example, a query (not shown) for the name "Christoph" matches the row 228 because that row includes the nickname Christoph, in which case the query "Christoph" returns the name Christopher Parker.

The expanded index 220 may be queried by primary name as well as by nickname. The query may specify that the query string is a primary name or nickname, but need not do so. For example, when querying by nickname, the query string is a nickname, and the result may be a primary name, index entry, or user profile associated with the nickname. A query 208 for the nickname "Chris" may return an index entry 228, e.g., "(Christopher|Chris|Christoph) Parker," which indicates that the associated primary name is Christopher Parker. When querying by primary name, the query string is interpreted as a primary name, and the result may be a nickname or index entry associated with the specified primary name. Therefore, if the query string specifies the primary name "Christopher," the query may return the nickname "Chris," since the index entry 228 associates the primary name "Christopher" with the nickname "Chris". The "Christopher" query may also return the nickname "Christoph" because Christoph is associated with the primary name "Christopher" by the index entry 228. The query may, but need not, specify whether the query is for a nickname or primary name. If such a query type is specified, then an error may be returned if a name of the specified type is not found. If the query type is not specified, then either a nickname, a primary name, or both may be returned, along with an indication of whether each returned name is a nickname or primary name.

FIG. 3 illustrates a table representation of an expanded index 302 with additional attributes. The expanded index 302 may be implemented as a table in a relational database, or an in-memory data structure in a computer system, or the like. A query for a primary name or nickname may include query attributes, such as a particular gender, to further constrain the possible results to entries having the specified attributes in addition to the nickname or primary name specified in the query. Each index entry may include one or more index entry attributes, such as a gender, language, location, and/or other attributes of the user represented by the index entry. For example, the index 302 includes a primary name column, a nickname column, a user identifier (ID) column, and a gender column. The primary name and nickname columns represent the association between primary names and nicknames as described above with reference to the index 210. The user ID column stores a user identifier that may be used to identify each user. The user ID may be used, for example, to establish a relation with another table in which additional attributes are stored, such as a user profile. Attributes may also be stored in the index 302 itself, as shown by the gender column, which represents a gender attribute. The gender attribute may be used as additional criteria to determine which index entry corresponds to a given query request.

In one or more embodiments, each row of the index 302 represents an index entry. The first row associates the primary name Christopher with the nickname Chris, user identifier ID1, and the male gender. The second row associates the primary name Christina with the nickname Chris, user identifier ID2, and the female gender. The gender attribute may be used to resolve queries that match multiple primary names or nicknames. For example, the gender attribute may be used to determine whether a query specifying the nickname Chris matches the "Christopher" entry of the first row or the "Christina" entry of the second row. If the query specifies a male gender attribute, then the query matches the first row, and the primary name Christopher is returned as the result of the query. The query results may also include the user identifier ID1 to identify the specific user. Otherwise, if the "Chris" query specifies a female gender attribute, then the query matches the second row, and the primary name Christina is returned.

FIG. 4 illustrates use of an expanded index 410 that includes a language attribute. The expanded index 410 can be used to determine results for queries that include attributes. A query 402 for a primary name or nickname may include attributes, such as "language=German." The query 402 may be executed by searching the index for an entry having the specified name and attribute. The index 410 associates primary names with nicknames and languages. The Name column represents a combination of the primary name and the nickname, as described above with reference to the index 220 of FIG. 2. Other representations of the index 410 are possible, e.g., with separate columns storing the given and family components of the primary name, and another column storing a list of nicknames. The index 410 may be expanded from a table of user (identifier, primary-name) entries to include nicknames by adding one or more nicknames to individual entries. Index entries are illustrated in the form (primaryname-given|nickname) primaryname-family, language. The index includes an entry 422 "(Christopher|Chris) Parker, English" that associates the nickname Chris with the given primary name Christopher, the given family name Parker, and the English language. A query 404 of the index 410 to search for entries having the name Chris and language=English returns the first index entry, (Christopher|Chris) Parker, English 422, which indicates that the associated primary name is Christopher Parker. A query 406 of the index for entries having the name Chris and language=German returns the second index entry, (Christoph|Chris) Schmidt, German 424, which indicates that the associated primary name is Christoph Schmidt. The nickname database index 410 may be generated from an initial index of primary names, such as a user index that maps usernames to user identifiers, primary names, and/or user profiles, by expanding the initial index to include nicknames and the languages associated with those nicknames. In the example of FIG. 4 the index 410 may be generated by expanding an index of primary names to include the nicknames Sam, Chris, and Bill with the attribute language=English, and Chris with the attribute language=German.

When a search request specifying a name is received, the social network may search the expanded index for index entries having a nickname that match the name. If the name is found in one of the index entries, then the matching index entry's username identifies a user having the nickname. The matching entry may also include the primary name of the user. The social network may then present information about the user having the nickname, such as the username, primary name, and/or or user profile, as a search result. If there are multiple index entries for the nickname, then one of the index entries may be selected based on attribute values associated with the entry, as described below.

There may be multiple different users associated with the same nickname, in which case the index may contain multiple entries for that nickname. The particular index entry to use for a given query may be selected based on attributes associated with the index entries. As described above, the attributes associated with expanded index entries may include gender, language, location, generation, a particular individual user identifier, and so on. When a search request specifies a name that is associated as a nickname with multiple index entries, one of the index entries may be selected for use as the search result by comparing one or more additional attributes of the index entries to corresponding attributes specified in the search request. The selected index entry may be, for example, the entry having attribute values that best match the corresponding attribute value specified in the search request.

Index entries may be gender-specific (e.g., "Chris→Christina" for females vs. "Chris→Christopher" for males), language-specific (e.g., "Stan→Stanislav" in Russian vs. "Stan→Stanley" in English), specific to an individual social network member (e.g., "Zuck→Mark Zuckerberg"), location-specific (e.g., "Maggie→Margaret" in Boston, Mass. vs. "Maggie→Magnolia" in Savannah, Ga.), or generation-specific (e.g., "Richard→Dick" for users with a birth year in the 1940's vs. "Richard→Ricky" for users with a birth year in the 1980's).

For example, given that Christina is a female name, one index entry for the nickname Chris, e.g., Chris→Christina, may include a "gender=female' attribute to indicate that the nickname applies to females. Similarly, an index entry for the nickname Chris, e.g., Chris→Christopher, may include a gender=male attribute to indicate that the nickname is for males. Search requests may specify particular desired values for one or more of these attributes, e.g., a search may specify nickname=Chris and gender=female. Other attributes such as language, location, and generation may be specified additionally or as alternatives to identify a matching index entry.

When the attributes of two different index entries also match, e.g., as in the entries Chris→Christina and Chris→Christine, both with gender=female, then additional attributes may be compared, e.g., the locations associated with the index entries, if present. If there is no difference between attribute values for two different index entries, then other techniques may be used to select the best match, as described below, or multiple matching entries can be returned as search results.

The best match may also be determined by ranking the potential matching index entries based on scores calculated for the index entries, with the best match being the entry having the highest ranking or score. Higher scores may be assigned to closer or more precise matches. Common nicknames may have higher scores than uncommon nicknames. For example, if the query is the nickname Chris, and Chris is a common nickname for Christopher, but a less common nickname for Christina, then a match having the username Christopher is assigned a higher score than a match having the username Christina.

An exact match of a query to an index entry is assigned a relatively high score, so that specifically requested names and attributes, such as a primary name equal to Chris (e.g., Chris as the primary name instead of a nickname), are determined to be the best match, even if other scoring criteria, such as frequency of occurrence of the name, produce a low ranking.

In one example, different weight values may be assigned to different types of attributes. The weights may also be based on a quantitative measure of similarity between the different values of the same attribute.

The best match may be determined by selecting the name that best fits an expected statistical distribution of nicknames. An expected statistical distribution may imply that one nickname is more common than another, at least under certain conditions, such as in particular languages or locations.

The best match may be determined using one or more of the aforementioned techniques. For example, the best match may be determined based on comparison of names and attributes, comparison of scores based on weights, or fitting an expected statistical distribution, or a combination of comparison of names and attributes, comparison of scores based on weights, and fitting an expected statistical distribution. For example, a weight value may be determined based on how well a name fits an expected statistical distribution.

FIG. 5 illustrates an example of generating an expanded index based on user actions in a user interface 502. Expanded index entries may be generated based on information that implies a primary name to nickname association. Nicknames may be identified by searching a user input log for a group of user input log entries in which a searching user entered an initial name 504 (e.g., "Bill") into a search interface, did not click on any search results (such as Benjamin K. Billings in the result 506), entered a second name 508 (e.g., "Will"), then clicked on a matching user in a second search result 510 having the second name 508 as a primary name. Changing the initial name to the second name 508 presumably led to a match with the correct primary name 510, since the user clicked on the second name 508 in the second search result 510. Therefore, the initial name 504 is likely a nickname for the user identified in the second search result 510 (e.g., Bill is likely a nickname for a user having the primary name Will Setchell). If a particular association is found between two names more than a threshold number of times, then the initial name may be added to a database index such as the index 302 of FIG. 3 as a nickname for the matching user in the second search result 510, or to a name-association log that is subsequently used to construct a database index, as described below.

FIG. 6 illustrates an example name-association log 602 for use in constructing a database index. The name-association log 602 may be used as an intermediate storage area from which associations that meet certain criteria are retrieved and used to construct an index, such as the index 302 of FIG. 3. In one or more embodiments, when an association between a primary name and a nickname is identified, e.g., as shown in FIG. 5, the association may be recorded as an event or entry in the name-association log 602. In one example, when at least a threshold number of events associating a particular nickname with a particular primary name has been identified or recorded, an association between the two names may be added to an index such as the index 302. For example, an existing association "Mel→Melvin" may be expanded to include "Mel→Melvin, Melissa" and a new association may be created as "Melissa→Mel".

Each event in the name-association log may be represented as a tuple of the form <nickname, username, attributes>. The attributes may be demographic attributes, such as gender, language, geographic location, nationality, age, and the like. For example, if the attributes are gender and language, then each event may be represented as the tuple <nickname, username, gender, language>. A frequency of occurrence of each distinct tuple may be determined by counting the number of occurrences of each distinct tuple. Multiple thresholds may be used to filter out noise, including a minimum frequency threshold and a probability threshold. A probability of each distinct tuple is determined by a frequency of the tuple divided by a frequency of all tuples with the same attributes. Using probability threshold, we can, for example, detect that one particular nickname-username association is more common for one language, but not so common for other languages. Events that occur less than a first threshold number of times, and/or with a frequency less than the frequency threshold, may be discarded as described above. The events may be associated with demographic attributes, such as gender or language, and the number of occurrences for each nickname, username, attribute>combination may be determined. Events having counts that meet or exceed the frequency threshold may be added to the index. If attributes are present, then thresholds can be determined for each attribute, and events having counts that meet the corresponding attribute-specific thresholds may be added to the index. In one example, counts of names, e.g., nicknames, primary names, nickname-primary name associations, and the like, in the events may be determined for each gender and language. The proportion of events for each gender and/or language may then be determined. For example, the proportion of events for the Russian language with female names may be determined. The proportions for each language and/or gender may be compared to proportion thresholds for that language and/or gender, and events for which the proportion is less than the corresponding proportion thresholds are discarded. The language-specific proportion thresholds protect events in less-common languages from being discarded. If an event meets the per-language threshold, it may be added to the index, or a third threshold may be applied so that only the top N most frequent events in each language are added to the index. The value of N may be, e.g., 3, 5, 10, or the like. The threshold numbers may be adjusted to reduce or eliminate noise due to errors, misspellings, etc.

In particular embodiments, metadata captured in the user input log may be analyzed to determine whether a particular set of user input log entries should or should not be grouped together. For example, a set of log entries may be grouped together if the log entries submitted by the same user, or in a single session, or within a threshold maximum duration of time, e.g., 3 seconds, of each other.

In particular embodiments, other metadata may be recorded together with the event, such as the language in which each name was entered, as well as attributes of the matching user (and/or the searching user), such as gender, location, hometown, birth year, etc. In such embodiments, once a threshold number of events in association with one or more particular attributes has been recorded, a new association may be created in the database index that includes the particular attribute(s), e.g., "Elizabeth→Betty (for birth years prior to 1965)" or "Maggie→Magnolia (for home addresses in Atlanta, Ga.)."

In particular embodiments, if a particular event is recorded multiple times with respect to one particular user (but nobody else), then a name-association may be created for the individual user. For example, the index entry Ivan-→TheTerrible (for userID 38429456738) may be created if the name-association log includes at least a threshold number of unsuccessful searches for the name TheTerrible followed by successful searches for the name Ivan.

Nicknames may also be inferred from other types of user interactions. For example, if a first user sends a Happy Birthday note to a second user, and the note includes a name different from that of the second user, then the name in the note is a potential nickname for the second user and may be added to the name-association log described above.

Particular embodiments provide incorporating data input by users, such as explicit or directly implied name-nickname associations, to enhance the database index. Expanded index entries may be created in response to user requests, e.g., when a user provides an alternate name or changes their name in a user profile. For example, a user profile may allow users to enter alternate names (e.g., nicknames) and/or to change their name (in order to affect how it is displayed and/or searchability).

When a user inputs a name association (e.g., by providing an alternate name in their profile, or by changing their name from a first name to a second name) a name-association index entry may be created in association with the specific user, for example: (1) "Ivan→TheTerrible" (for userID 38429456738) or "Janice→JayBay" (for userID 29109288890). If more than one user enters that particular name association, then a more generalized name-association index entry may be created once a minimum threshold number (of such users) is exceeded.

In particular embodiments, if all such users entering the name association in question share some common attribute (e.g., all indicate their primary language as Russian and their location as West Hollywood, Calif.), then those common attributes may be included in the index entry (and used when a query is received). When a search request specifying a name is received, a database query may be constructed to search the expanded index. This index expansion technique may result in faster searches, since latency and system load due to run-time query expansion for the same purpose may be reduced or eliminated.

Figure 7A:
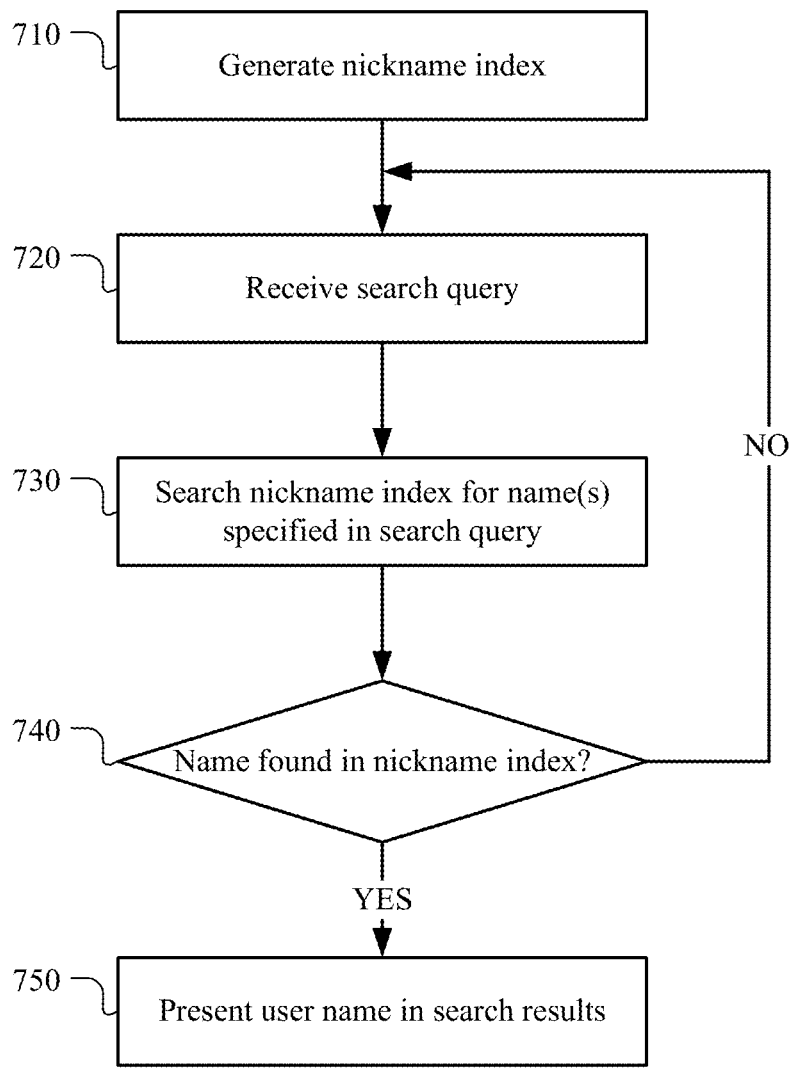
FIGS. 7A and 7B illustrate an example method for generating and searching an expanded index.

FIG. 7A illustrates an example method 700 for generating and searching an expanded index. The method may begin at step 710, which generates the expanded index. Step 710 may, for example, expand an existing index, such as an index that maps user account names to primary names, by adding nicknames to entries of the index for particular users as nicknames for those users are identified. Step 710 may invoke the index generation method 710 shown in FIG. 7B. The method 700 may continue to step 720 after one or more nicknames have been added to the index at step 710. Concurrently with method 700, the index generation method 710 may continue to identify nicknames and add the nicknames to entries of the index. At step 720, a search query is received. Note that the expanded index may be generated and updated separately from search query operations, and multiple queries may be performed once an index has been generated. At step 730, the expanded index is searched for the one or more names that were specified in the query. At step 740, the results of the search are evaluated to determine whether the name(s) specified in the query were found in the search index. If so, block 750 presents the primary name in a list of search results or other user interface for displaying names. If the name(s) are not found in the search index, then no results are displayed, and the method continues at block 720 by waiting for another query to be received.

Particular embodiments may repeat one or more steps of the method of FIG. 7A, where appropriate. Although this disclosure describes and illustrates particular steps of the method of FIG. 7A as occurring in a particular order, this disclosure contemplates any suitable steps of the method of FIG. 7A occurring in any suitable order. Moreover, although this disclosure describes and illustrates an example method for generating and searching an expanded index including the particular steps of the method of FIG. 7A, this disclosure contemplates any suitable method for generating and searching an expanded index, including any suitable steps, which may include all, some, or none of the steps of the method of FIG. 7A, where appropriate. Furthermore, although this disclosure describes and illustrates particular components, devices, or systems carrying out particular steps of the method of FIG. 7A, this disclosure contemplates any suitable combination of any suitable components, devices, or systems carrying out any suitable steps of the method of FIG. 7A.

Figure 7B:
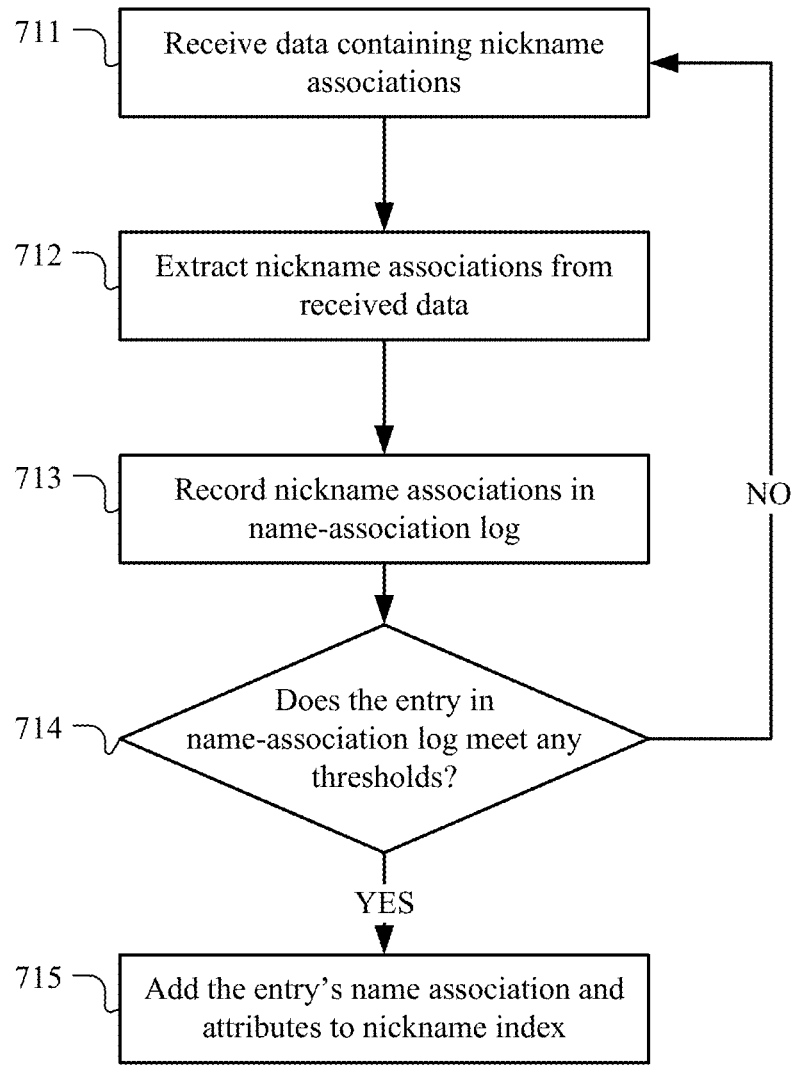

FIG. 7B illustrates an example method 710 for generating an expanded index. The method 710 of FIG. 7B may be invoked, for example, by block 710 of FIG. 7A. The method may begin at step 711 by receiving data containing one or more nickname associations, such as log entries (as described above). Block 712 extracts the nickname association(s) from the received data. Block 713 records the nickname associations in a second log, which is referred to herein as a name-association log. Block 714 determines whether the entry that was stored in the name-association log meets any thresholds, as described above. If so, block 715 adds the name of each name association that meets a threshold to the expanded index. If not, block 714 may return control to block 711, which receives additional data containing additional nickname associations, and repeats the method. The method 710 may be executed concurrently with the method 700 of FIG. 7A, so that nickname lookups may be processed, and the expanded index may be updated as new nickname associations are received. For example, when the end of a log file containing nickname associations has been reached at step 711, and no further associations are available, the method 710 may return control to the method 700, while continuing to wait for additional data to appear in the log file.

Figure 8:
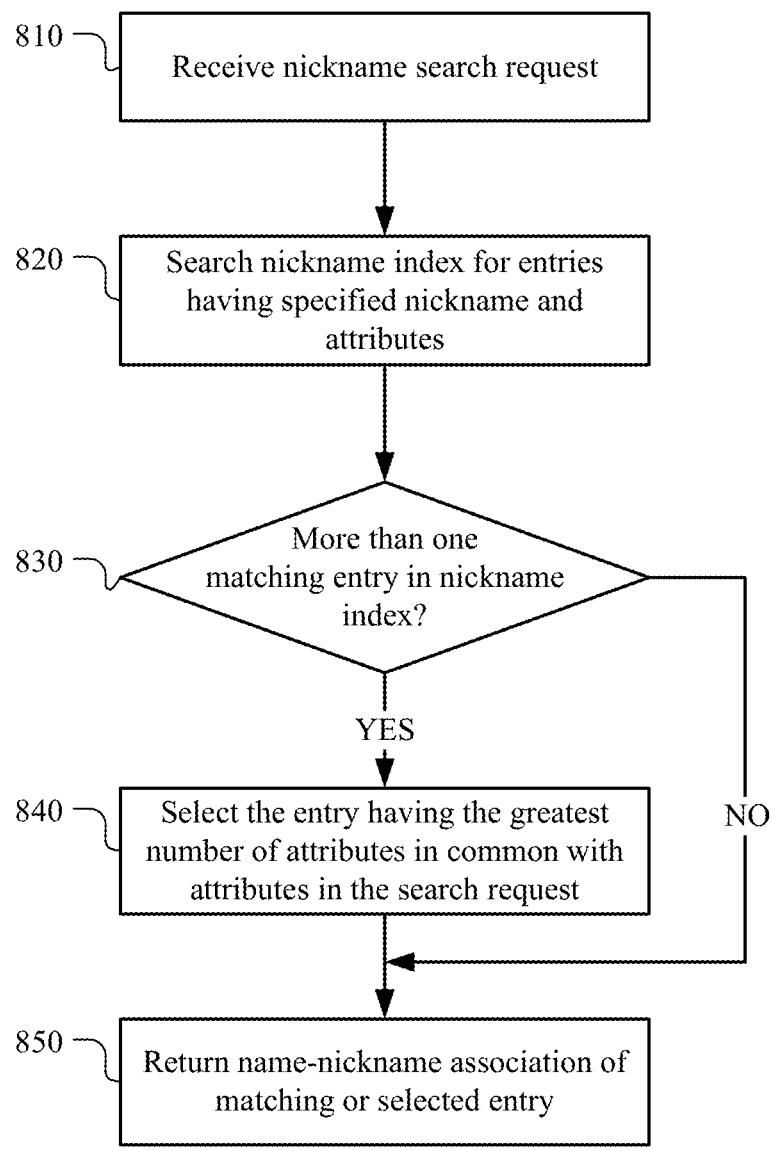
FIG. 8 illustrates an example method for searching an expanded index for a nickname having one or more specified attributes.

FIG. 8 illustrates an example method 800 for searching an expanded index for a nickname having one or more specified attributes. The method 800 may be used, for example, in place of steps 720-740 of the method of FIG. 7A. The method 800 may begin at block 810 by receiving a nickname search request that specifies a nickname for which a corresponding user (e.g., actual name or user profile) is to be found. Block 820 searches the expanded index for entries having the nickname and attribute(s) specified in the search request. The attributes may be particular values for the location, language, and gender of the person to be found by the search. Block 830 determines whether the search in block 820 returned more than one matching entry. If so, block 840 selects the entry having the greatest number of attributes in common with the attributes in the search request, and the method continues at block 850 using the selected entry. If not, the method continues at block 850 using a single matching entry as the selected entry. Block 850 returns the name-nickname association represented by the selected entry as a result of the method 800.

Figure 9:
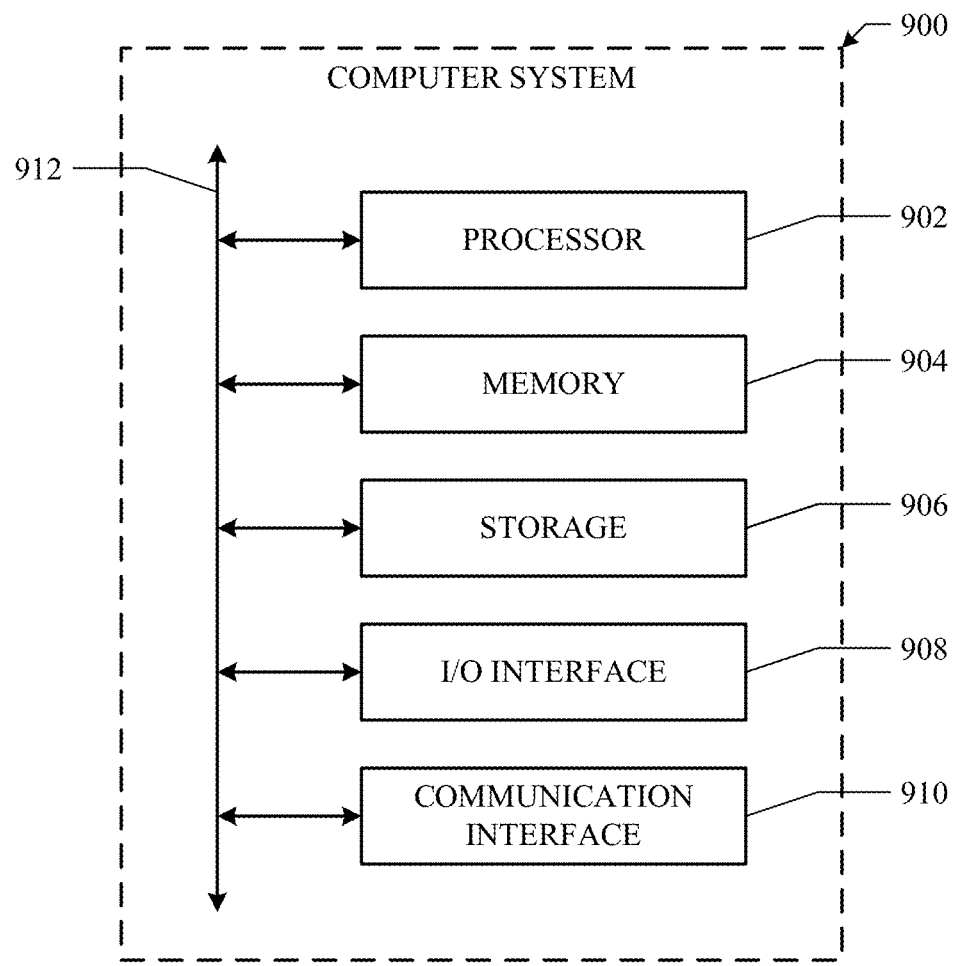
FIG. 9 illustrates an example computer system.

FIG. 9 illustrates an example computer system 900. In particular embodiments, one or more computer systems 900 perform one or more steps of one or more methods described or illustrated herein. In particular embodiments, one or more computer systems 900 provide functionality described or illustrated herein. In particular embodiments, software running on one or more computer systems 900 performs one or more steps of one or more methods described or illustrated herein or provides functionality described or illustrated herein. Particular embodiments include one or more portions of one or more computer systems 900. Herein, reference to a computer system may encompass a computing device, and vice versa, where appropriate. Moreover, reference to a computer system may encompass one or more computer systems, where appropriate.

This disclosure contemplates any suitable number of computer systems 900. This disclosure contemplates computer system 900 taking any suitable physical form. As example and not by way of limitation, computer system 900 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example and not by way of limitation, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 900 includes a processor 902, memory 904, storage 906, an input/output (I/O) interface 908, a communication interface 910, and a bus 912. Although this disclosure describes and illustrates a particular computer system having a particular number of particular components in a particular arrangement, this disclosure contemplates any suitable computer system having any suitable number of any suitable components in any suitable arrangement.

In particular embodiments, processor 902 includes hardware for executing instructions, such as those making up a computer program. As an example and not by way of limitation, to execute instructions, processor 902 may retrieve (or fetch) the instructions from an internal register, an internal cache, memory 904, or storage 906; decode and execute them; and then write one or more results to an internal register, an internal cache, memory 904, or storage 906. In particular embodiments, processor 902 may include one or more internal caches for data, instructions, or addresses. This disclosure contemplates processor 902 including any suitable number of any suitable internal caches, where appropriate. As an example and not by way of limitation, processor 902 may include one or more instruction caches, one or more data caches, and one or more translation lookaside buffers (TLBs). Instructions in the instruction caches may be copies of instructions in memory 904 or storage 906, and the instruction caches may speed up retrieval of those instructions by processor 902. Data in the data caches may be copies of data in memory 904 or storage 906 for instructions executing at processor 902 to operate on; the results of previous instructions executed at processor 902 for access by subsequent instructions executing at processor 902 or for writing to memory 904 or storage 906; or other suitable data. The data caches may speed up read or write operations by processor 902. The TLBs may speed up virtual-address translation for processor 902. In particular embodiments, processor 902 may include one or more internal registers for data, instructions, or addresses. This disclosure contemplates processor 902 including any suitable number of any suitable internal registers, where appropriate. Where appropriate, processor 902 may include one or more arithmetic logic units (ALUs); be a multi-core processor; or include one or more processors 902. Although this disclosure describes and illustrates a particular processor, this disclosure contemplates any suitable processor.

In particular embodiments, memory 904 includes main memory for storing instructions for processor 902 to execute or data for processor 902 to operate on. As an example and not by way of limitation, computer system 900 may load instructions from storage 906 or another source (such as, for example, another computer system 900) to memory 904. Processor 902 may then load the instructions from memory 904 to an internal register or internal cache. To execute the instructions, processor 902 may retrieve the instructions from the internal register or internal cache and decode them. During or after execution of the instructions, processor 902 may write one or more results (which may be intermediate or final results) to the internal register or internal cache. Processor 902 may then write one or more of those results to memory 904. In particular embodiments, processor 902 executes only instructions in one or more internal registers or internal caches or in memory 904 (as opposed to storage 906 or elsewhere) and operates only on data in one or more internal registers or internal caches or in memory 904 (as opposed to storage 906 or elsewhere). One or more memory buses (which may each include an address bus and a data bus) may couple processor 902 to memory 904. Bus 912 may include one or more memory buses, as described below. In particular embodiments, one or more memory management units (MMUs) reside between processor 902 and memory 904 and facilitate accesses to memory 904 requested by processor 902. In particular embodiments, memory 904 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 904 may include one or more memories 904, where appropriate. Although this disclosure describes and illustrates particular memory, this disclosure contemplates any suitable memory.

In particular embodiments, storage 906 includes mass storage for data or instructions. As an example and not by way of limitation, storage 906 may include a hard disk drive (HDD), a floppy disk drive, flash memory, an optical disc, a magneto-optical disc, magnetic tape, or a Universal Serial Bus (USB) drive or a combination of two or more of these. Storage 906 may include removable or non-removable (or fixed) media, where appropriate. Storage 906 may be internal or external to computer system 900, where appropriate. In particular embodiments, storage 906 is non-volatile, solid-state memory. In particular embodiments, storage 906 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 906 taking any suitable physical form. Storage 906 may include one or more storage control units facilitating communication between processor 902 and storage 906, where appropriate. Where appropriate, storage 906 may include one or more storages 906. Although this disclosure describes and illustrates particular storage, this disclosure contemplates any suitable storage.

In particular embodiments, I/O interface 908 includes hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 908 for them. Where appropriate, I/O interface 908 may include one or more device or software drivers enabling processor 902 to drive one or more of these I/O devices. I/O interface 908 may include one or more I/O interfaces 908, where appropriate. Although this disclosure describes and illustrates a particular I/O interface, this disclosure contemplates any suitable I/O interface.

In particular embodiments, communication interface 910 includes hardware, software, or both providing one or more interfaces for communication (such as, for example, packet-based communication) between computer system 900 and one or more other computer systems 900 or one or more networks. As an example and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 910 for it. As an example and not by way of limitation, computer system 900 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 900 may include any suitable communication interface 910 for any of these networks, where appropriate. Communication interface 910 may include one or more communication interfaces 910, where appropriate. Although this disclosure describes and illustrates a particular communication interface, this disclosure contemplates any suitable communication interface.

In particular embodiments, bus 912 includes hardware, software, or both coupling components of computer system 900 to each other. As an example and not by way of limitation, bus 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 912 may include one or more buses 912, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving data that includes at least one event indicating an association between a nickname and a primary name;
   by the computing device, determining whether the at least one association between the nickname and the primary name meets a nickname association threshold, wherein the association meets the nickname association threshold when at least a threshold number of events associating the nickname with the primary name are identified in the data,
   wherein determining whether the at least one association meets a nickname association threshold comprises accessing a counter value associated with a combination of the nickname and the primary name, wherein the at least one association meets the nickname association threshold when the counter value is greater than the nickname association threshold; and
   by the computing device, generating at least one expanded index entry that associates the nickname with the primary name when the at least one association meets the nickname association threshold.

2. The method of claim 1, wherein the data comprises a log entry indicating that a search for the nickname that returns the primary name as a result was followed by a user selection of the primary name, the method further comprising:
   by the computing device, incrementing a counter value associated with a combination of the nickname and the primary name, wherein the counter value represents a number of occurrences of the combination of the nickname and the primary name in the data.

3. The method of claim 1, wherein the data comprises a first log entry indicating that a search for the nickname returned a result that the user did not select, followed by a second log entry indicating that a search for the primary name returned the primary name, and a user selected the primary name, the method further comprising:
by the computing device, incrementing a counter value associated with a combination of the nickname and the primary name.

4. The method of claim 1, wherein generating at least one expanded index entry that associates the nickname with the primary name comprises:
by the computing device, storing an association between the nickname and the primary name in a database index, wherein the database index comprises a table stored in a database, the association is represented as a database row in the table, and the database row includes the nickname and the primary name.

5. The method of claim 1, wherein the data comprises a name association log that includes a plurality of entries representing a plurality of associations between one or more nicknames and one or more primary names, the method further comprising:
by the computing device, counting a number of occurrences of the at least one association between the nickname and the primary name in the log, wherein the at least one association meets the nickname association threshold when the number of occurrences of the at least one association meets or exceeds the nickname association threshold.

6. The method of claim 5, wherein the plurality of associations are between the one or more nicknames, the one or more primary names, and at least one demographic attribute, wherein counting the number of occurrences further comprises:
by the computing device, counting a number of occurrences of at least one attribute association between the nickname, the primary name, and the at least one demographic attribute,
wherein the at least one association meets the nickname association threshold when the number of occurrences of the at least one attribute association meets or exceeds an attribute threshold that corresponds to the at least one attribute association, and
the at least one expanded index entry associates the nickname with the primary name and the at least one demographic attribute.

7. The method of claim 6, wherein the at least one demographic attribute includes a gender, language, geographic location, nationality, age, or a combination thereof.

8. The method of claim 1, further comprising:
by the computing device, receiving a search query that includes a specified nickname;
by the computing device, identifying, in an expanded index, one or more matching index entries that associate the specified nickname with an associated primary name; and
by the computing device, presenting the associated primary name as a search result.

9. The method of claim 8, wherein the one or more matching index entries further associate the specified nickname and the associated primary name with at least one demographic attribute.

10. The method of claim 9, wherein the search query includes one or more requested demographic attributes, and identifying the one or more matching index entries comprises:
by the computing device, selecting a particular index entry from the one or more matching index entries, wherein the particular index entry has a greater number of demographic attributes in common with the requested demographic attributes than do other index entries in the one or more matching index entries.

11. One or more computer-readable non-transitory storage media embodying software that is operable when executed to:
receive data that includes at least one event indicating an association between a nickname and a primary name;
determine whether the at least one association between the nickname and the primary name meets a nickname association threshold, wherein the association meets the nickname association threshold when at least a threshold number of events associating the nickname with the primary name are identified in the data,
wherein to determine whether the at least one association meets a nickname association threshold, the software is further operable when executed to access a counter value associated with a combination of the nickname and the primary name, wherein the at least one association meets the nickname association threshold when the counter value is greater than the nickname association threshold; and
generate at least one expanded index entry that associates the nickname with the primary name when the at least one association meets the nickname association threshold.

12. The media of claim 11, wherein the data comprises a log entry indicating that a search for the nickname that returns the primary name as a result was followed by a user selection of the primary name, and the software is further operable when executed to:
increment a counter value associated with a combination of the nickname and the primary name, wherein the counter value represents a number of occurrences of the combination of the nickname and the primary name in the data.

13. The media of claim 11, wherein the data comprises a first log entry indicating that a search for the nickname returned a result that the user did not select, followed by a second log entry indicating that a search for the primary name returned the primary name, and a user selected the primary name, and the software is further operable when executed to:
increment a counter value associated with a combination of the nickname and the primary name.

14. The media of claim 11, wherein to generate at least one expanded index entry that associates the nickname with the primary name, the software is further operable when executed to:
store an association between the nickname and the primary name in a database index, wherein the database index comprises a table stored in a database, the association is represented as a database row in the table, and the database row includes the nickname and the primary name.

15. The media of claim 11, wherein the data comprises a name association log that includes a plurality of entries representing a plurality of associations between one or more nicknames and one or more primary names, and the software is further operable when executed to:

count a number of occurrences of the at least one association between the nickname and the primary name in the log, wherein the at least one association meets the nickname association threshold when the number of occurrences of the at least one association meets or exceeds the nickname association threshold.

16. The media of claim 15, wherein the plurality of associations are between the one or more nicknames, the one or more primary names, and at least one demographic attribute, wherein to count the number of occurrences the software is further operable when executed to:

count a number of occurrences of at least one attribute association between the nickname, the primary name, and the at least one demographic attribute, wherein the at least one association meets the nickname association threshold when the number of occurrences of the at least one attribute association meets or exceeds an attribute threshold that corresponds to the at least one attribute association, and the at least one expanded index entry associates the nickname with the primary name and the at least one demographic attribute.

17. A system comprising:
one or more processors; and
a memory coupled to the processors comprising instructions executable by the processors, the processors being operable when executing the instructions to:
receive data that includes at least one event indicating an association between a nickname and with a primary name;

determine whether the at least one association between the nickname and the primary name meets a nickname association threshold, wherein the association meets the nickname association threshold when at least a threshold number of events associating the nickname with the primary name are identified in the data, wherein to determine whether the at least one association meets a nickname association threshold, the processors are further operable when executing the instructions to access a counter value associated with a combination of the nickname and the primary name, wherein the at least one association meets the nickname association threshold when the counter value is greater than the nickname association threshold; and generate at least one expanded index entry that associates the nickname with the primary name when the at least one association meets the nickname association threshold.

18. The system of claim 17, wherein the data comprises a name association log that includes a plurality of entries representing a plurality of associations between one or more nicknames and one or more primary names, and the processors are further operable when executing the instructions to:

count a number of occurrences of the at least one association between the nickname and the primary name in the log, wherein the at least one association meets the nickname association threshold when the number of occurrences of the at least one association meets or exceeds the nickname association threshold.

* * * * *